United States Patent [19]
Wang

[11] Patent Number: 5,182,435
[45] Date of Patent: Jan. 26, 1993

[54] ELECTRIC SOLDERING IRON WITH FORKED SUCTION PIPE FOR REMOVING SOLDERING SMOKE AND COOLING THE HANDLE OF THE SOLDEREING IRON

[76] Inventor: Chiou-Liang Wang, 19, Lane 156, Sec. 1, Ling-Yun Rd., Wu-Ku Village, Taipei, Taiwan

[21] Appl. No.: 831,106

[22] Filed: Feb. 4, 1992

[51] Int. Cl.⁵ .......................... B23K 3/00; H05B 3/00
[52] U.S. Cl. ........................ 219/230; 219/137.41; 219/238; 219/533; 228/20; 228/57
[58] Field of Search .............. 219/230, 236–239, 219/137.41, 533; 228/19, 20, 51–55, 57

[56] References Cited

U.S. PATENT DOCUMENTS

| | | | |
|---|---|---|---|
| 2,041,018 | 5/1936 | Persons | 219/230 X |
| 2,184,980 | 12/1939 | Smith | 219/230 X |
| 3,798,409 | 3/1974 | Troyer et al. | 219/137.41 |
| 4,284,873 | 8/1981 | Schluter | 219/137.41 |
| 4,358,662 | 11/1982 | Cranor et al. | |
| 5,079,404 | 1/1992 | Zamuner | 219/137.41 |

FOREIGN PATENT DOCUMENTS

| | | | |
|---|---|---|---|
| 853068989 | 4/1986 | European Pat. Off. | |
| 60-177959 | 9/1985 | Japan | 219/230 |
| 62-267070 | 11/1987 | Japan | 219/230 |
| 959941 | 9/1982 | U.S.S.R. | 219/230 |
| 1186417 | 10/1985 | U.S.S.R. | 219/230 |
| 2053761 | 2/1981 | United Kingdom | |

*Primary Examiner*—Anthony Bartis
*Attorney, Agent, or Firm*—Jacobson, Price, Holman & Stern

[57] ABSTRACT

An electric soldering iron has an elongated hollow handle casing having a tubular hollow holder extending from one end thereof and supporting a soldering bit heated by an electric heater within the holder. A forked suction pipe is secured to the holder and includes a main pipe having an intake port at one end disposed adjacent to the soldering tip and an outlet port at its other end connected to an induced-draft fan assembly through a flexible air pipe. A branch pipe of the suction pipe extends laterally from the main pipe and has an intake port connecterd to the interior of the casing through a heat resistant hose. Actuation of the induced-draft fan causes soldering fumes generated at the tip to be drawn into the main pipe and for cooling ambient air to be drawn through the casing from an inlet at its other end to remove excess heat from the casing.

2 Claims, 4 Drawing Sheets

ELECTRIC SOLDERING IRON WITH FORKED SUCTION PIPE FOR REMOVING SOLDERING SMOKE AND COOLING THE HANDLE OF THE SOLDEREING IRON

BACKGROUND OF THE INVENTION

The present invention relates to electric soldering irons. More particularly, the present invention relates to an electric soldering iron having a suction pipe for removing smoke and dust upon the process of soldering.

During the process of a soldering operation in heating a soldering paste or soldering flux (tin solder), a smoke or poisonous gas may be produced. This smoke or poisonous gas must be removed so as not to let it enter an operator's lungs. Further, the handle of an electric soldering iron may be heated by the soldering bit thereof after certain length of time in a soldering operation, making it uncomfortable to hold. Sometimes, the electric heating coil of an electric soldering iron may be damaged when excessively heated.

SUMMARY OF THE INVENTION

The present invention has been accomplished to eliminate the aforesaid problems. It is therefore the main object of the present invention to provide an electric iron with suction pipe which can effectively remove smoke and dust upon the process of soldering. According to the present invention, there is provided an electric soldering iron having a suction pipe holder secured to an electric heater holder thereof by screw means to hold a forked suction pipe. The forked suction pipe is secured to the suction pipe holder by screw means and comprised of a straight pipe and a branch pipe. The branch pipe obliquely extends downwards from the straight pipe and is connected to the hand-hold portion of the casing by a heat-resisting hose. The straight pipe has one end connected to an induced-draft fan assembly and an opposite end disposed adjacent to the soldering bit. Therefore, the heat inside the hand-hold portion of the casing and the smoke around the soldering bit are carried away through the forked suction pipe by means of the operation of the induced-draft fan assembly upon the process of a soldering operation.

DETAILED DESCRIPTION OF THE PREFERRED EMBODIMENT

Figure 1:
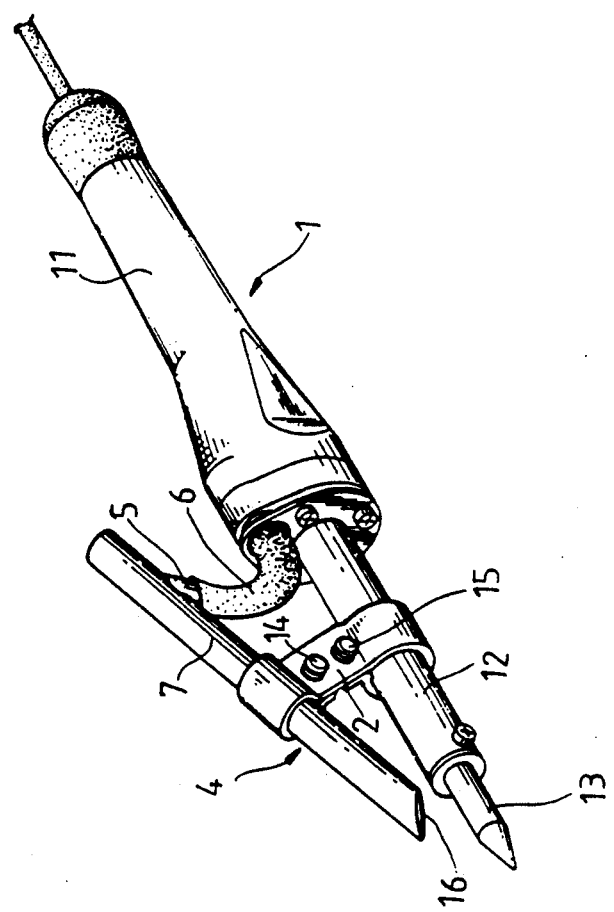
FIG. 1 is an elevational view of an electric soldering iron embodying the present invention.
Figure 2:
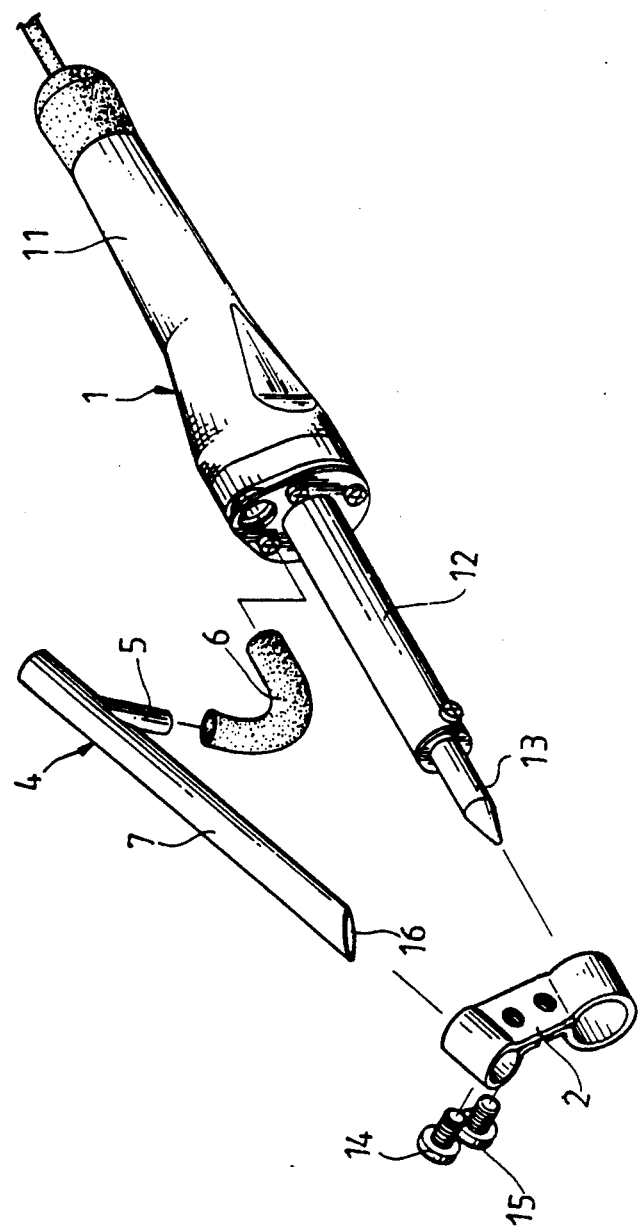
FIG. 2 is an exploded view of the electric soldering iron of FIG. 1.

Referring to FIGS. 1 and 2, there is illustrated an electric iron constructed in accordance with the present invention which is generally comprised of a casing 1, a suction pipe holder 2, a forked suction pipe 4, and a heat-resisting hose 6. The casing 1 of the soldering iron is comprised of a hand-hold portion 11 at one end, a soldering bit 13 at an opposite end and a tubular electric heater holder 12 longitudinally aligned therebetween.

The electric heater holder includes therein an electric heater 12a having a power supply 12b. The suction pipe holder 2 is mounted on the electric heater holder 12 at a suitable location for holding the forked suction pipe 4. The forked suction pipe 4 is comprised of a straight main pipe 7 and a branch pipe 5, wherein the straight pipe 7 has one end connected to an induced-draft fan assembly 20 via a flexible suction pipe 3 (see FIG. 3). The heat-resisting hose 6 has one end connected to the branch pipe 5 of the forked suction pipe 4 and an opposite end inserted into the hand-hold portion 11 of the casing 1. By means of the arrangement of the suction pipe holder 2, the forked suction pipe 4 is secured to the electric heater holder 12 at a suitable location for removing smoke and dust. By means of the arrangement of the heat-resisting hose 6, the heat produced inside the hand-hold portion during the process of soldering can be carried away through the forked suction pipe 4.

Figure 3:
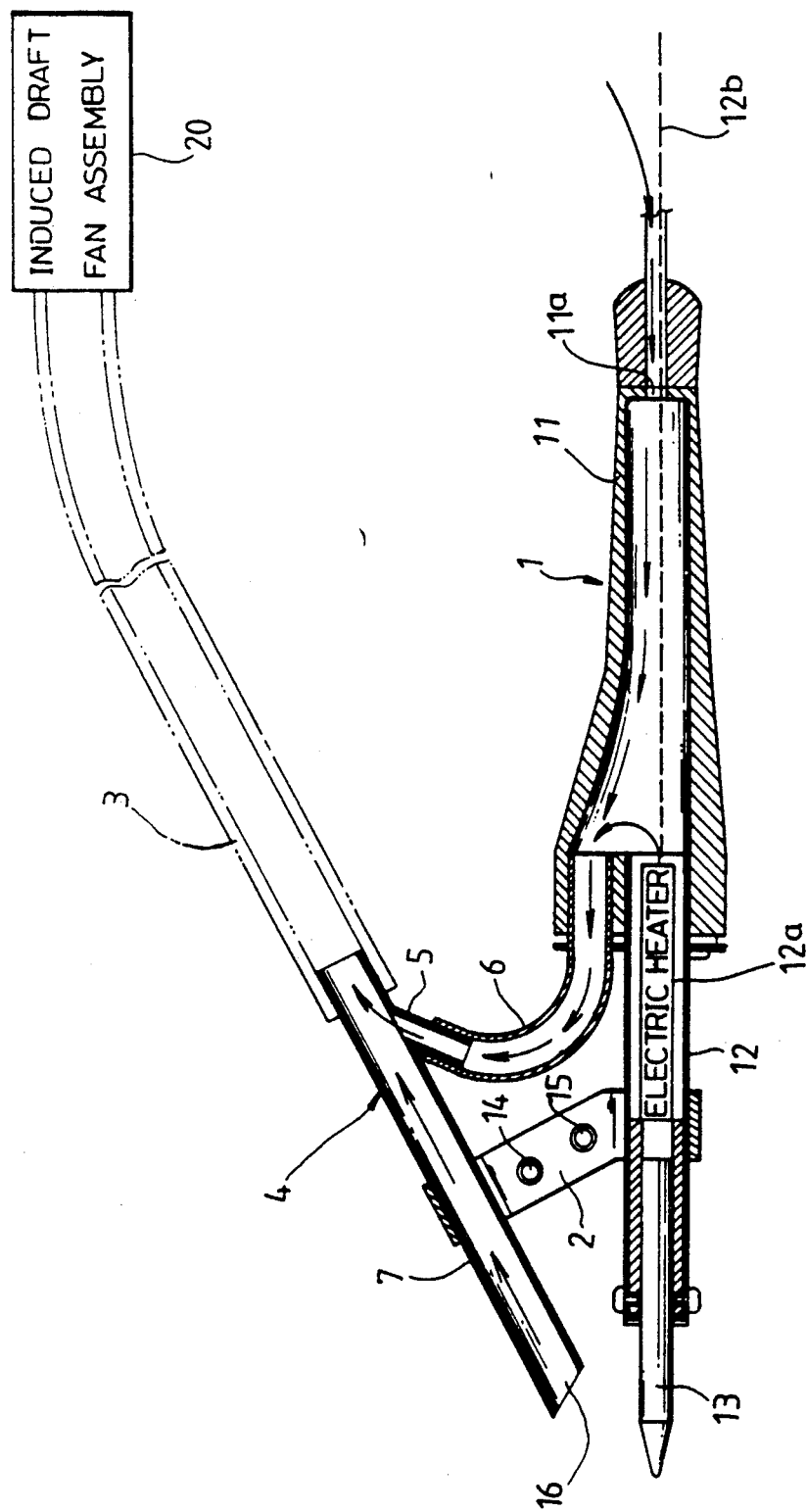
FIG. 3 is a longitudinally cross sectional view of the electric iron of FIG. 1 showing the moving direction of current of air.
Figure 4:
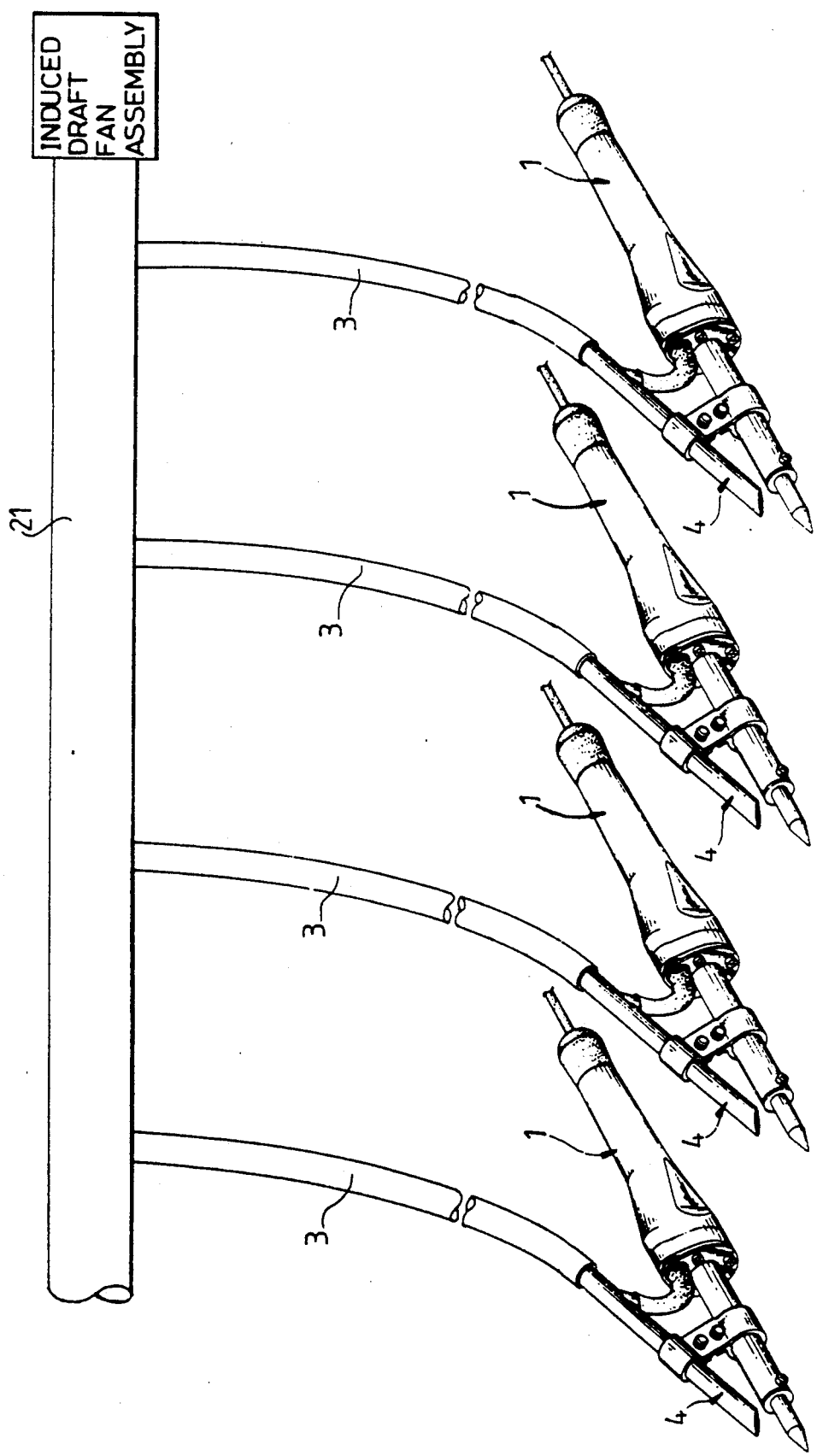
FIG. 4 is an elevational view showing that the suction pipes of several electric irons according to the present invention are connected to an induced-draft fan pipe assembly.

During the process of a soldering operation, the induced-draft fan assembly 20 is turned on, and therefore, smoke and dust can be removed out of the area around the soldering bit 13 through the forked suction pipe (see FIGS. 3 and 4).

Referring to FIG. 2 again, the suction pipe holder 2 is secured to the electric heater holder 12 by a screw 15; the forked suction pipe 4 is secured to the suction pipe holder 2 by a screw 14. Therefore, the suction pipe holder 2 and the forked suction pipe 4 can be easily dismantled for cleaning and repair by loosening the screws 14 and 15.

As indicated, the forked suction pipe 4 is comprised of a straight pipe 7 and a branch pipe 5. The branch pipe 5 obliquely extends from the straight pipe 7 and connects to the hand-hold portion 11 of the casing 1 by the heat-resisting hose 6. As shown by the arrows in FIG. 3, cooling air from an inlet 11a is thus drawn through the casing 11. The straight pipe 7 is secured to the electric heater holder 12 by the suction pipe holder 2 and connected to the induced-draft fan assembly 20 by the flexible air pipe 3. By means of adjusting the mounting position of the suction pipe holder 2 on the electric heater holder 12, the intake port 16 of the straight pipe 7 of the forked suction pipe 4 is set into the best suction position adjacent to the soldering bit 1 for removing smoke and dust efficiently.

FIG. 4 shows a number of electric soldering irons according to the invention in which the respective suction pipes 3 are connected to an induced draft fan assembly 20 through a common pipe 21.

What is claimed is:

1. In an electric soldering iron of the type comprising a hollow casing including a hand-hold portion at one end and a soldering bit at an opposite end, said bit being supported by a tubular electric heater holder longitudinally aligned between the bit and the casing and holding an electric heater therein permitting said soldering bit to be heated by said electric heater for the process of soldering, the improvement comprising a suction pipe holder securing a forked suction pipe having a pair of intake ports and an outlet port to said electric heater holder, wherein said suction pipe holder is made from a curved plate secured to said electric heater holder by screw means; said forked suction pipe is comprised of a main pipe defining one of said intake ports at one end and said outlet port at its other end and a branch pipe connected at one end to said main pipe and having a second end defining the other intake port, the forked pipe being secured to said suction pipe holder by screw means with said outlet port thereof being connected to an induced-draft fan assembly through a flexible air pipe, said other intake port of said suction pipe being connected to said hand-hold portion of said hollow casing by a heat-resisting hose and said one of said intake ports being disposed adjacent to said soldering bit, said hand-hold portion of said hollow casing having an air inlet to allow ambient air to be drawn therethrough by the suction pipe.

2. The electric soldering iron of claim 1, wherein said branch pipe obliquely extends downwards from said main pipe.

* * * * *